(No Model.)
F. X. BYERLEY.
PURIFYING PARAFFINE AND EXTRACTING OIL FROM OLEAGINOUS MATERIALS.
No. 347,288. Patented Aug. 10, 1886.
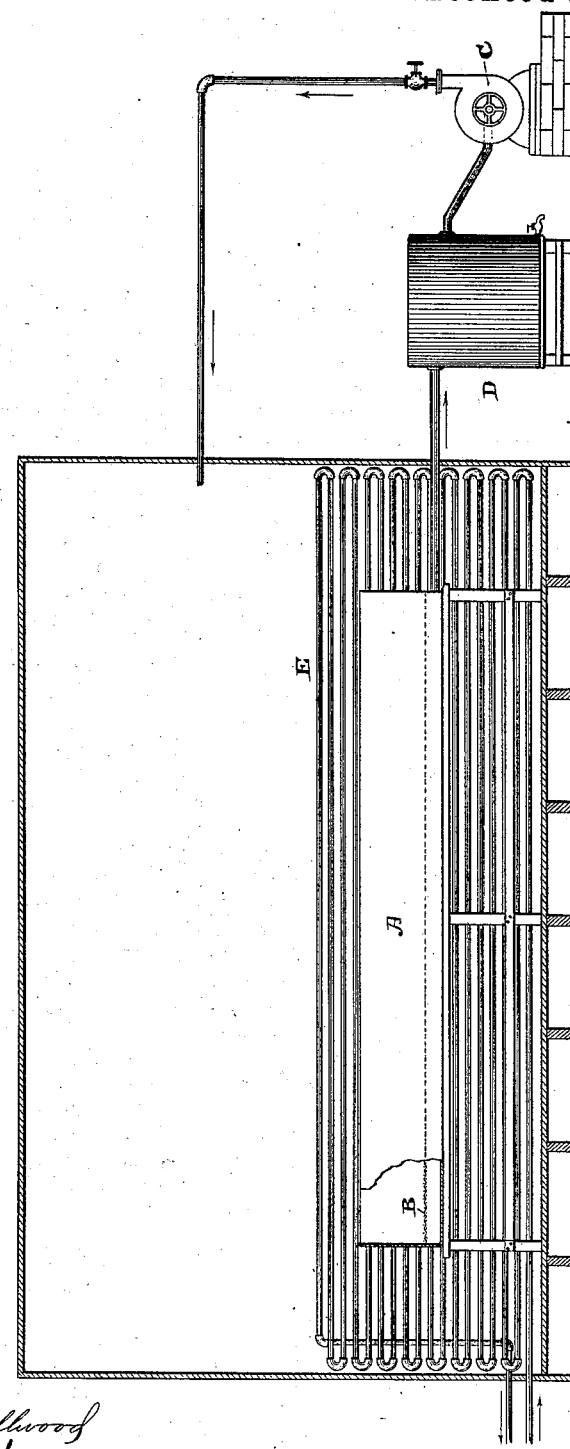

UNITED STATES PATENT OFFICE.

FRANCIS X. BYERLEY, OF CLEVELAND, OHIO, ASSIGNOR OF ONE-HALF TO CHARLES M. MIX, OF SAME PLACE.

PURIFYING PARAFFINE AND EXTRACTING OIL FROM OLEAGINOUS MATERIALS.

SPECIFICATION forming part of Letters Patent No. 347,288, dated August 10, 1886.

Application filed May 18, 1886. Serial No. 202,558. (No specimens.)

*To all whom it may concern:*

Be it known that I, FRANCIS X. BYERLEY, a citizen of the United States, residing at Cleveland, in the county of Cuyahoga and State of Ohio, have invented certain new and useful Improvements in Purifying Paraffine and Extracting Oil from Oleaginous Materials, of which the following specification is a full, clear, and exact description.

This invention relates to the removal from paraffine scales and other wax or waxy substances the oil and soft part, and also has reference to the extraction of oil from oleaginous seeds, bones, and other materials.

It consists in forcing through the paraffine scales or wax in a divided form air or other gas or vapor, condensible or non-condensible, heated to a temperature at or above the melting or liquefying point of the softer parts, and below that of the harder portions, and withdrawing the liquefied from the solid portions.

It also consists, specially, in forcing the gas or vapor so heated downward through the material, so that the currents assist in withdrawing the liquefied portions, and also in raising gradually the temperature of the hot gas or vapor during the purifying or extracting operation, so that the softest parts are removed first, and those less soft subsequently. The air or other gas or the vapor may be forced through the material either by compression on the entering or upper side of the wax or by exhaustion on the opposite side, or by both; but preference is given to exhaustion simply. Any ordinary or suitable compressor or aspirator may be used. Any ordinary or suitable heater may be employed for raising the temperature of the gases or vapor.

The invention further consists in extracting, by air or other gas or a non-condensible vapor heated to the proper temperature, the oil or oily substance in a liquid form from oleaginous materials generally, including the extraction of fatty and resinous matters, as well as hydrocarbons, whether liquid or solid, at ordinary temperatures, from all sorts of materials containing the same, whether the oil or oily substance to be extracted is united with a non-liquefiable portion, as in the case of meal from linseed, cotton-seed, and other oil-bearing seeds, or from bones, or is united with a portion liquefiable at a higher temperature, as in the case of paraffine and other wax.

Heretofore heated vapors of petroleum-naphtha and of other light hydrocarbons which have a special affinity for oil or grease have been passed through oily materials—such as bones, greasy waste, and the like—for the purpose of extracting the oil therefrom; but in all these processes, so far as I am aware, the vapors were condensed in the material to a greater or less extent, and the oil was obtained as a solution in the light hydrocarbon liquid, from which it was necessary to separate it by distilling of the solvent. The present invention, by dispensing with a liquid solvent, avoids the necessity for such separation, and it also avoids the danger and expense incurred in the use of those volatile and inflammable materials, since air and other common gases may be, and preferably are, employed.

It is also to be observed that hot air has been forced through seed-meal and other substances to warm and dry the same preparatory to squeezing the oil therefrom by a press. Hot air has also been forced through seed-meal and other solid residuum from which the oil has been extracted by hydrocarbon vapor or liquid for removing the remaining solvent, or the moisture resulting from the steaming operation used to expel said solvent. In none of these cases, however, is the oil extracted by a gas or non-condensible vapor heated to the liquefying-point of the oil to be extracted and forced through the oleaginous material; neither, so far as I am aware, have hot vapors of any kind been forced through paraffine for the purpose of purifying the same by separating the softer parts therefrom.

The following is a description of what is considered the best mode of applying the principle of the invention, the accompanying drawing, which forms a part of this specification, representing an apparatus suitable for use:

A is a box open at the top and closed at the bottom, and provided with a strainer, B, at a short distance above the bottom. An aspirator, C, (shown as a centrifugal pump,) communicates with the space under the strainer, an air-tight receptacle, D, for collecting the oil drawn off, being interposed. These parts are or may all be such as commonly employed in percolation with hydrocarbon liquid, the sprinkler and the top to the percolating apparatus being omitted.

The apparatus is placed in a room provided with steam-coils or radiators E, or other convenient means for heating the air therein, and the pump C discharges into said room, although it could of course discharge into a chimney or into the open air. For purifying paraffine, the scales are placed on the strainer to a depth of, say, about six inches. The temperature of the air in the room is raised to between 100° and 110° Fahrenheit, though this must be governed by the melting or liquefying point of the scales. The temperature at which the soft parts of the scales melt or liquefy having been attained, the pump or aspirator is set to work, so as to draw the warm air through the paraffine. With a layer of the depth indicated, and a barometric pressure below the strainer B of about twenty inches of mercury, or ten inches less than the atmospheric pressure in the room, the difference in pressure will suffice to force the air through at a suitable rate. The air in its passage liquefies and carries off the softer parts, and these being liquefied run into and collect in the receptacle D, from which they can be removed as desired. This temperature is maintained until all or nearly all the material which melts or liquefies at that temperature has been extracted. The paraffine having now become harder, the temperature of the room is gradually raised until it reaches nearly the melting-point of the original scales, and the pump is kept in action until the desired degree of purity is attained. The purified paraffine is then removed and finished in any ordinary or suitable way. Other wax is heated in a similar way, due regard being had to the respective melting-points of the softer parts to be removed and the harder ones to be retained.

If oleaginous seeds or bones are to be treated, the seed or bone meal is or may be placed upon the strainer to about the depth of from eight to twelve inches, and the same degree of vacuum is or may be maintained; but the temperature of the air is raised to about 200° Fahrenheit, which temperature has been found suitable for the purpose. The temperature may be varied, but it should not be so high as injuriously to affect the meal. The pump or aspirator is kept in action until the oil or oily matter, or as much thereof as desired, has been extracted. The meal is then removed and a new supply placed in the strainer. Other materials are treated in an analogous way. The oil extracted may be treated in any desired way, such treatment forming no part of the present invention.

Modifications may be made in details without departing from the spirit of the invention, and parts of the invention may be used separately.

I claim as my invention or discovery—

1. The method of treating materials containing bodies of different fusibility by forcing through the same gas or vapor heated to or above the melting or liquefying point of the softer portions, and below that of the harder portions, and withdrawing the liquefied from the solid portions, substantially as described.

2. The method of treating paraffine or wax by forcing through the same a gas such as atmospheric air heated to or above the melting or liquefying point of the softer portions, and below that of the harder portions, and withdrawing the liquefied from the solid portions, substantially as described.

3. The method of treating paraffine or wax by forcing downward through the same air or other gas or vapor heated to or above the liquefying-point of the softer portions, and below that of the harder portions, and withdrawing the liquefied from the solid portions, substantially as described.

4. The method of treating paraffine by forcing through the same air heated to or slightly above the liquefying-point of the softer portions, withdrawing the portions liquefied at that temperature, then gradually, while continuing to force the air through the paraffine, raising the temperature thereof nearly to the melting-point of the hard paraffine to be obtained, substantially as described.

5. The method of extracting oil or oily substances from oleaginous materials by forcing through the latter air or other gas or non-condensible vapor heated to or above the liquefying-point of the substance to be extracted and withdrawing the liquefied portion, substantially as described.

6. The method of extracting oil or oily substances from oleaginous materials by forcing air or other gas or non-condensible vapor heated to the liquefying-point of the oil or oily substance downward through a body or layer of the oleaginous material and withdrawing the liquefied portion, substantially as described.

In testimony whereof I have signed this specification in the presence of two witnesses.

FRANCIS X. BYERLEY.

Witnesses:
C. W. NOBLE,
T. A. McCASLIN.